United States Patent Office 3,507,206
Patented Apr. 21, 1970

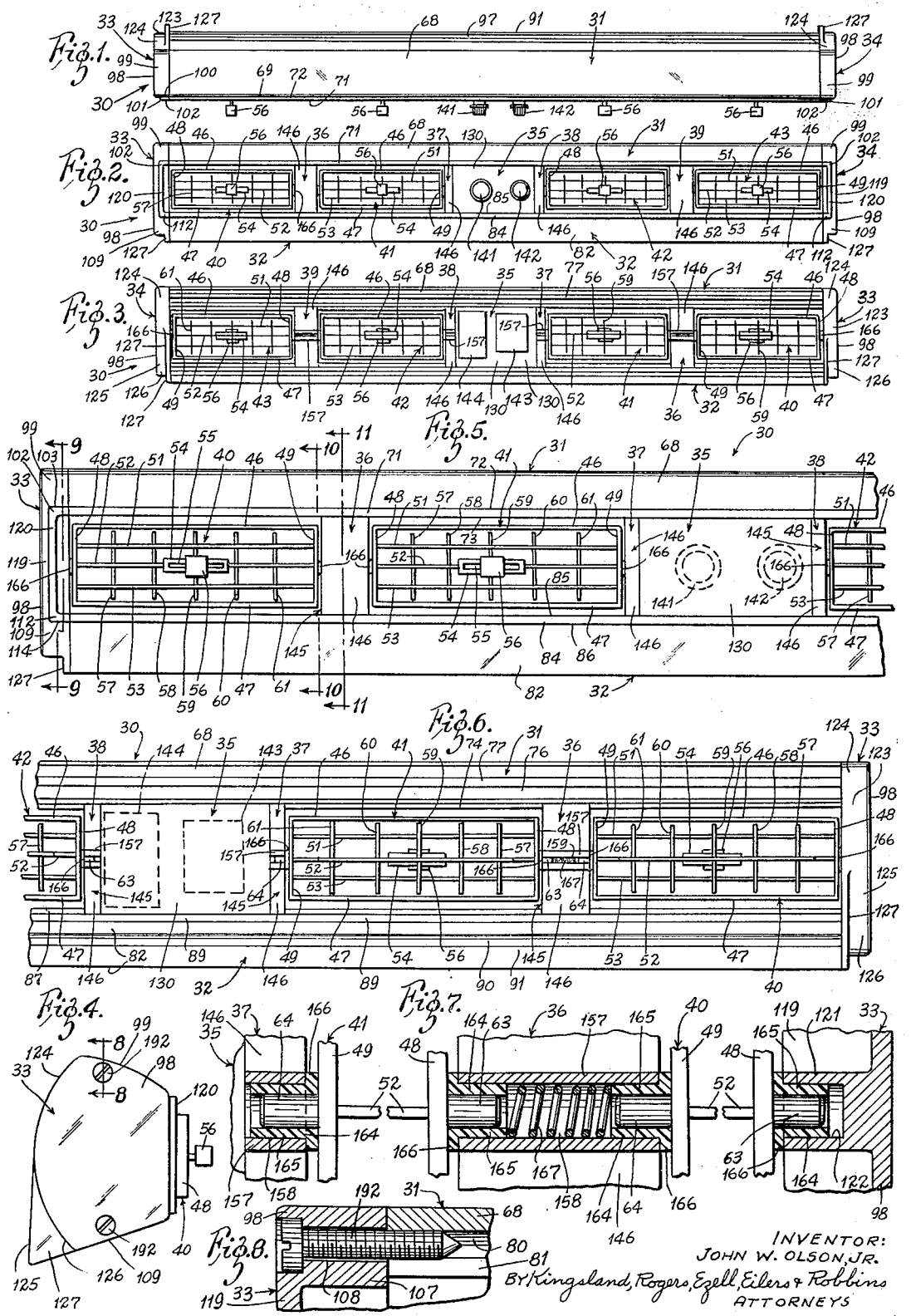

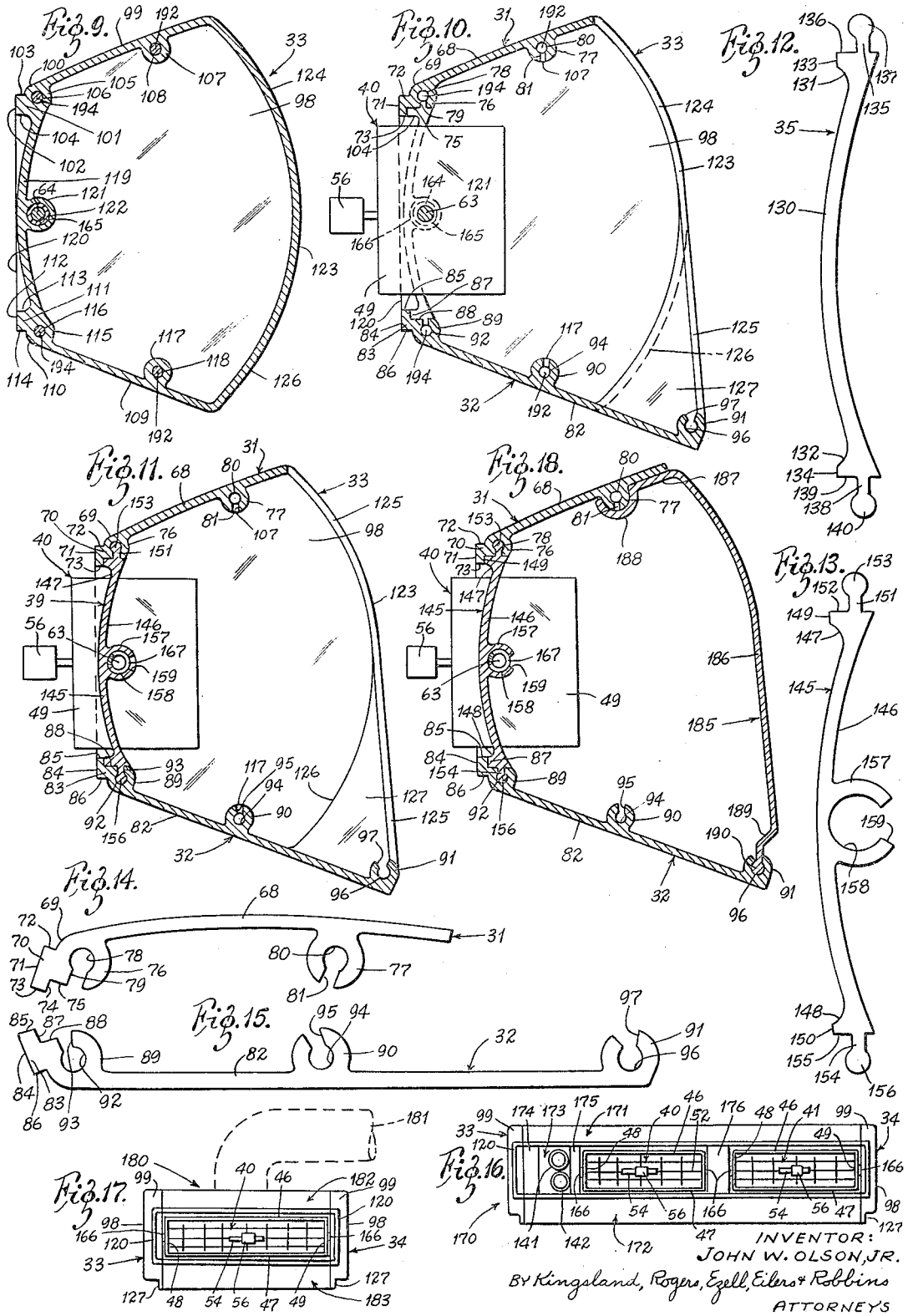

3,507,206
EVAPORATOR CASING FOR VEHICLE AIR
CONDITIONERS
John W. Olson, Jr., Dallas, Tex., assignor to John E.
Mitchell, Dallas, Tex., a corporation of Missouri
Filed Apr. 19, 1968, Ser. No. 722,590
Int. Cl. F24f 13/08
U.S. Cl. 98—114                                    9 Claims

ABSTRACT OF THE DISCLOSURE

An evaporator casing assembled from panel extrusions cut to lengths as required for the size of the evaporator casing, which panel extrusions are interchangeable in various lengths for similar, differently sized evaporator casings. End caps are identical to end caps used for other differently sized evaporator casings, and louver units are interchangeable among differently sized evaporator casings. Interlocking fits between extrusion panels provide quick assembly of air-tight joints. Reduced inventory and rapid re-design with inventoried extrusions can be made for each vehicle model change.

BRIEF DESCRIPTION OF THE INVENTION

The design of the evaporator casing of this invention makes possible a great variety of evaporator sizes to accommodate different custom installations in vehicles. The universality and interchangeability of panel extrusions and other components that are used in the assembly of each evaporator casing permits substantial reduction in the amount of tooling required to change evaporator casing designs with each model change of vehicles.

Generally, the evaporator casing supports one or more louver units. These louver units are of any conventional design. The casing which supports these louver units is made up of cut panels from constant cross-section extrusions held together at universal end caps. The extrusions are cut to lengths required for the different sizes of evaporator casings. Grommets mounted in certain ones of the face extrusions, called filler panel extrusions, pivotally support pins on the louver units to enable pivoting of the louver units about horizontal axes for vertical air deflection.

Different evaporator units may require different numbers of louver units. For these variations in evaporator casings, the assembly simply requires different length cuts of extrusion panels. Therefore, greatly reduced inventory of panel parts is required for the large number of different evaporator casing sizes.

BRIEF DESCRIPTION OF THE DRAWINGS

FIGURE 1 is a top plan in view of an evaporator casing.

FIGURE 2 is a front elevation view of the evaporator casing of FIGURE 1.

FIGURE 3 is a rear elevation view of the evaporator casing of FIGURE 1.

FIGURE 4 is an end elevation view of the evaporator casing as viewed from the left side of FIGURE 2, and on an enlarged scale.

FIGURE 5 is an enlarged fragmentary front elevation view of the left half portion of the evaporator casing of FIGURE 2.

FIGURE 6 is a fragmentary rear elevation view of the portion of the evaporator casing shown in FIGURE 5.

FIGURE 7 is a fragmentary and broken view in section longitudinally and medially of the pivot mounts for the louver units.

FIGURE 8 is an enlarged view fragmentary view in section taken along line 8—8 of FIGURE 4.

FIGURE 9 is an enlarged view in section taken along the line 9—9 of FIGURE 5.

FIGURE 10 is an enlarged view in section taken along the line 10—10 of FIGURE 5.

FIGURE 11 is an enlarged view in section taken along the line 11—11 of FIGURE 5.

FIGURE 12 is an end elevation view of the central extrusion used for mounting the control knobs.

FIGURE 13 is an end elevation view of the filler extrusion cut to various lengths for supporting the pivot mount.

FIGURE 14 is an enlarged and elevation view of the upper panel extrusion.

FIGURE 15 is an enlarged end elevation view of the lower panel extrusion.

FIGURE 16 is a front elevation view of another form of evaporator casing illustrating how the extrusions can be cut to modified lengths for different evaporator casing designs.

FIGURE 17 is a front elevation view of still another evaporator casing illustrative of the variations which are possible.

FIGURE 18 is a view in section generally along the line 11—11 of FIGURE 5, but showing the incorporation of a rear extrusion panel.

DETAILED DESCRIPTION OF THE INVENTION

The evaporator casing 30 of FIGURES 1, 2 and 3 is illustrative of the different evaporator casings and configurations that are possible with the flexible design of this invention. The evaporator casing has a top panel extrusion 31, a bottom panel extrusion 32, and end caps 33 and 34. There is a knob support panel extrusion 35 and there are filler panel extrusions 36, 37, 38, and 39 of various widths. The evaporator casing 30 includes four louver units 40, 41, 42 and 43.

Each louver unit 40, 41, 42, and 43 is preferably made of plastic or aluminum with a rectangular frame having a top 46, a bottom 47, and left and right sides 48 and 49. A plurality of horizontal deflectors 51, 52, and 53 extend between and are mounted to the sides 48 and 49. In the center of the middle horizontal deflector 52, a frame 54 is formed to provide a horizontal slot 55 within which a control knob 56 is horizontally sildable. There are a plurality of vertical louvers 57, 58, 59, 60 and 61 pivotally mounted between the upper and lower sides 46 and 47 of the frame, with suitable connections (not shown) to the control knob 56 to enable pivoting of the vertical louvers 57-61 when the control knob 56 is slid horizontally in the slot 55. There is a pin 63 extending outwardly from the center of the left side 48 and another pin 64 extending outwardly from the center of the right side 49 of the louver unit frame. These pins 63 and 64 are incorporated in mounts which will be described to enable pivoting of each louver unit about a horizontal axis when the control knob 56 is moved vertically.

The designs of these louver units 40, 41, 42, and 43 may vary, and the way the louvers are pivoted may vary. It is within the concept of this invention that, whatever their design, the louver units are uniform and may be used interchangeably at various positions in various arrangements of evaporator units of which the unit 30 is only an example.

The top panel extrusion 31 is formed from a plastic or aluminum extrusion having the cross section generally illustrated in FIGURE 14. This extrusion 31 has a slightly curved upper wall 68 with a rounded forward end 69 leading to a flange 70. The flange 70 has a vertical forward surface 71, horizontal upper and lower surfaces 72 and 73, and a short vertical rearward face 74 leading to a horizontal shoulder 75. There are ribs 76 and 77 projecting below the curved upper wall 68. The forward rib 76 is positioned behind the flange 70 and above the shoulder 75. The other rib 77 is spaced near the rear edge of the extrusion 31. There is a longitudinal opening 78 of circular cross section through the rib 76 with a longitudinal vertical slot 79 communicating with the opening 78. Another longitudinal opening 80 of circular cross section extends through the rib 77, with a longitudinal slot 81 communicating with the opening 80.

The panel extrusion 31 may be cut to any length. For the evaporator unit 30, the extrusion 31 is cut to a length corresponding to the desired width of the evaporator unit.

The lower panel extrusion 32 has the cross sectional shape generally illustrated in FIGURE 15 with a generally flat bottom wall 82 having an upwardly curved forward end leading to a flange 83. The flange 83 has a vertical front face 84, horizontal upper and lower faces 85 and 86, and a short vertical rear face 87 leading to the horizontal shoulder 88. A longitudinal rib 89 extends upwardly from the wall 82 behind the flange 83 and below the shoulder 88. Another longitudinal rib 90 extends upwardly near the center of the wall 82, and a longitudinal rib 91 extends upwardly along the rear edge of the wall 82. A longitudinal opening 92 of circular cross section extends through the rib 89, with a slot 93 extending vertically downwardly to communicate with the opening 92. A longitudinal opening 94 extends through the rib 90, with a vertical slot 95 communicating with the opening 94. A longitudinal opening 96 extends through the rib 91, with a vertical slot 97 communicating with the opening 96.

The panel extrusion 32 may be cut to any desired length, for the evaporator unit 30, the panel is cut to a length corresponding to the width of the evaporator unit.

The shapes of the end caps 33 and 34 are identical but opposite, and therefore only one need be described in detail. As shown particularly in FIGURES 4 and 9, the end cap 33 has a side wall 98. An upper flange 99 is shaped like the extrusion 31 with a curved forward edge 100 leading to a horizontal rib 101 having a flat front face 102 and horizontal upper and lower faces 103 and 104. There is a rib 105 behind the rib 101 having a longitudinal opening 106 of circular cross section through it. Another rib 107 projects downwardly from the flange 99 and has an opening 108 of circular cross section through it. The location of the rib 101 corresponds to the location of flange 70. The faces 71 and 102 are aligned in assembly as are the faces 72 and 103 and the faces 73 and 104. Likewise, the ribs 76 and 105 are aligned, and the ribs 77 and 107 are aligned. The flange 99 aligns with the wall 68 of the extrusion 31.

The end cap 33 has a lower flange 109 having a curved forward end 110 leading to a flange 111. The flange 111 has a flat front face 112 and horizontal upper and lower faces 113 and 114. A rib 115 with an opening 116 of circular cross section extending through it is positioned behind the rib 118. Another rib 117 with an opening 118 through it projects upwardly from the flange 109. The flange 109 is shaped like the extrusion 32, and corresponding faces and ribs aligned in the final assembly.

A curved forward flange 119 extends between the ribs 105 and 115. A vertical rib 120 extends between and has the same cross-section as the ribs 101 and 111. A boss 121 extends rearwardly from the center of the flange 119. The boss 121 has a recess 122 of circular cross section in it.

As shown in FIGURE 10, a rearward flange 123 has a curved upper section 124 extending downwardly from the upper flange 99 and a straight lower section 125 extending upwardly from the lower flange 109. The rearward flange 123 also has an outer lower curved section 126. A panel 127 extends between the flange sections 125 and 126.

The central panel extrusion 35, as shown in FIGURE 12 comprises a curved front wall 130 having outwardly curved upper and lower ends 131 and 132 leading to vertical upper and lower edges 133 and 134. A web 135 projects upwardly from a horizontal shoulder 136 to a longitudinal bead 137 of circular cross section. Another web 138 projects downwardly from a horizontal shoulder 139 to a longitudinal bead 140 of circular cross section.

The extrusion 35 is cut to any desired length according to the appropriate width for a particular evaporator unit assembly. Appropriate holes (not shown) are cut through the wall 130 to permit the passage of operating knobs 141 and 142 connected to suitable controls 143 and 144, such as blower and thermostat controls.

The beads 137 and 140 are sized to fit within the openings 78 and 92 in the panel extrusions 31 and 32 with the webs 135 and 138 extending through the slots 79 and 93, and the shoulders 136 and 139 bearing against the shoulders 75 and 88.

The filler panels 36, 37, 38 and 39 are different widths cut from a common extrusion having the general cross section illustrated in FIGURE 13. This extrusion 145 has a curved front wall 146 with rounded upper and lower ends 147 and 148 leading to vertical upper and lower faces 149 and 150. A longitudinal web 151 extends upwardly from an upper shoulder 152 to a bead 153 of circular cross section. Another web 154 extends downwardly from a lower horizontal shoulder 155 to a longitudinal bead 156 of circular cross section. A longitudinal rib 157 extends rearwardly from the center of the wall 146. A longitudinal opening 158 through the rib 157 is of the same diameter as that of the recess 122 in the boss 121 on the end cap 33. The opening 158 may extend to a narrow longitudinal slot 159.

Filler panels are cut to desired lengths according to the widths necessary for different evaporator unit assemblies. For the evaporator unit 30, the four filler panels 36, 37, 38 and 39 are cut from the common extrusion 145 to the lengths illustrated.

As shown particularly in FIGURE 7, the louver units 40, 41, and 42 and 43 are mounted with their pins 63 and 64 rotatably supported in plastic grommets 164. Each plastic grommet 164 has a sleeve 165 that extends into the recess 122 or the opening 158 in a filler panel made from the extrusion 145. A grommet 164 has an annular shoulder 166 that acts as a stop against the end of the boss 124, or against an end of the rib 155. A compression spring 167 is mounted between two grommets 164 to bias them apart and eliminate excess looseness in the mounting of the louver units 40, 41, 42 and 43. Preferably, there is a compression spring 167 on at least one side of each louver unit 40, 41, 42 and 43. The compression spring eliminates the requirement of cutting the filler panels 36, 37, 38 and 39 to excessively close tolerances.

FIGURE 16 illustrates another evaporator casing assembly 170. In the evaporator casing 170, only two louver units 40 and 41 are used. The upper and lower panel extrusions 171 and 172 are therefore shorter. However, they are still cut from the same extrusions 31 and 32 illustrated in FIGURES 14 and 15. Also, the same end caps 33 and 34 are used. The control panel 173 is differently located and has different holes in it for different locations of operating knobs 141 and 142. Also, the width of the panel 173 is different. However, it is still cut from the same extrusion 35 illustrated in FIGURE 12. Likewise, only three filler panels 174, 175 and 176 are used, and they may be of different widths than the filler panels 36, 37, 38 and 39 of the casing 30. However, the panels 174, 175, and 176 are cut from the same extrusion 145 illustrated in FIGURE 13.

FIGURE 17 illustrates another evaporator casing 180 that uses only one louver unit 40. This casing 180 might correspond to a dash-mounted evaporator casing having an air supply hose 181 connected to it. Upper and lower panels 182 and 183 are shorter but cut from the same extrusions 31 and 32 illustrated in FIGURES 14 and 15. The same end caps 33 and 34 are used. In the evaporator casing 180, no filler plates are used and there is no central control panel cut from the extrusion 35 of FIGURE 12. This is because the evaporator casing 180 is associated with other evaporator casings, and one of the others would have the operating knobs 141 and 142.

FIGURE 18 shows a rear panel filler extrusion 185 that may be used for those assemblies in which the evaporator casing of this invention is wider than the evaporator unit itself. For example, casing design aesthetics for some vehicles may call for an evaporator casing 30 to extend the full width, or most of the width, of the vehicle dash. Yet, the evaporator cooling unit may be much narrower.

The extrusion 185 serves as fillers for the areas at the rear side of the evaporator casing not occupied by the evaporator unit. This extrusion 185, which has a generally vertical wall 186, a short upper wall 187, a longitudinal wall 188, a bend section 189, and a lower longitudinal bead 190, is of constant cross-section.

The extrusion is cut to the desired length to act as a filler. Then it is slidably interlocked between the extrusions 31 and 32 with the cup 188 around the rib 77 and the bead 190 within the opening 96.

The evaporator casing design makes the assembly of evaporator casings, such as the casing 30, the casing 170, or the casing 180, or any other size evaporator casing, very easy. Inventory of parts is greatly reduced, and design changes for accommodating vehicle model changes is substantially facilitated.

In assembling the evaporator casing 30, a length is cut from the extrusion 31 illustrated in FIGURE 14 corresponding to the necessary width of the upper panel 31 of FIGURE 2. Similarly, an appropriate length is cut from the extrusion 32 illustrated in FIGURE 15. The proper length for the central control panel is cut from the extrusion 35 illustrated in FIGURE 13. Proper lengths of extrusions for the filler panels 36, 37 38, and 39 are cut from the extrusion 145 illustrated in FIGURE 14.

An end cap, such as the end cap 33, is fastened to the upper and lower panels 31 and 32 by self tapping screws 192 threaded through the openings 108 and 118 in the end cap 33 and into the openings 80 and 94 of the panels 31 and 32. Dowel pins 194 that are integral with the end cap, project into the openings 78 and 92 of the panels 31 and 32.

Next a louver unit 40 is positioned with its pin 63 projecting into a grommet 164, the grommet 164 having been located within the recess 122 in the end cap 33. A compression spring 167 is located within the opening 158 in the filler panel 36. Grommets 164 are mounted in the ends of the opening 158, and the filler panel 36 is slid into interlocking engagement with the openings 78 and 92 in the panels 31 and 32. The filler panel 36 is slid across until the pin 64 projects into the grommet 164 as illustrated in FIGURE 7.

Next the louver unit 42 and the filler panel 38 are similarly installed. This is followed by sliding the central control panel 35 into interlocking engagement with the openings 78 and 94 in the panels 31 and 32.

Thereafter, the filler panel 38, the louver unit 42, the filler panel 39, and the louver unit 43 are installed in series. If needed extrusions 185 are installed as fillers for spaces not occupied by the evaporator unit. Finally, the other end cap 34 is mounted in place by self tapping screws 185.

This same process of installation and assembly is practiced for the evaporator casings 170 and 180 illustrated in FIGURES 17 and 18. The difference is that the various panels are cut to the appropriate lengths and the number of louver units is selected and installed as required for the different sizes of casings 170 and 180.

Various changes and modifications may be made within the purview of this invention as will be readily apparent to those skilled in the art. Such changes and modifications are within the scope and teaching of this invention as defined by the claims appended hereto.

What is claimed is:

1. An evaporator casing comprising at least two louver units for directing air flow, an upper panel, a lower panel, the upper panel having a constant cross section, the said panels having frontal edges defining a front opening between them, the lower panel having a constant cross section, the louver units being pivotally mounted in said opening for rotation about a horizontal axis and having pins rotatably supported in grommets, an end cap at each end of the upper and lower panels, the upper and lower panels being connected to the end cap, a filler panel between the louver units, interlocking means connecting the filler panel to the upper and lower panels, the filler panel being of constant cross section, and means biasing at least one grommet toward the louver unit to eliminate excessive looseness in fit.

2. An evaporator casing assembled from standardized parts of constant cross section which may be cut and combined to form a casing for evaporator units of various sizes, said casing comprising an upper panel and a lower panel, each of said panels having constant cross sections and having frontal edges defining a front opening between them, sliding track means adjacent to and along said edges, a plurality of filler panels having constant cross sections and having parallel upper and lower edges complementary to the sliding track means for slidably engaging said sliding track means, an end cap at each end of said upper and lower panels, said upper and lower panels being connected to said end caps, and at least one louver unit pivotally mounted in said opening for rotation about a horizontal axis.

3. The evaporator casing of claim 2 wherein each louver unit has pins rotatably supported in grommets and means biasing at least one grommet toward the louver unit to eliminate excessive looseness in fit.

4. The evaporator casing of claim 2 including at least one rear panel of constant cross section slidably engaging said upper and lower panels.

5. An evaporator casing comprising an upper panel and a lower panel, each of said panels having constant cross sections and having frontal edges defining an opening between them, sliding track means adjacent to and along said edges, at least one filler panel having constant cross section and having track riding means slidably engaging said track means, an end cap at each end of said upper and lower panels, said upper and lower panels being connected to said end caps, and a plurality of louver units pivotally mounted in said opening for rotation about a horizontal axis.

6. The evaporator casing of claim 5 wherein each louver unit has pins rotatably supported in grommets and means biasing at least one grommet toward the louver unit to eliminate excessive looseness in fit.

7. The evaporator casing of claim 5 including at least one rear panel of constant cross section slidably engaging said upper and lower panels.

8. A plurality of evaporator casings formed from an inventory of standardized components which include an elongated upper panel extrusion that can be cut to selected lengths for upper panels, an elongated lower panel extrusion that can be cut to selected lengths for lower panels, an elongated filler panel extrusion that can be cut to form filler panels, standardized end caps, and identical louver units, thereby enabling the cutting and assembly of evaporator casings customized in size and design to various ones of many makes and models of vehicles, each evaporator casing comprising an upper panel of predetermined length according to the installation requirements of a particular vehicle cut from the upper panel extrusion; a lower panel cut from the lower panel extrusion and having the same length as the upper panel, the upper panel and the lower panel each having constant cross sections; an end cap from inventory connected to each end of the upper and lower panels, and supporting the upper and lower panels in spaced parallel relationship to one another with their front edges defining a front opening between them; a plurality of louver units depending in number on the size of the casing; a filler panel cut from the filler panel extrusion for mounting between each pair of louver units; each filler panel being of constant cross section; sliding track means adjacent the front edges of the upper and lower panels, the filler panels having upper and lower edges complementary to the sliding track means for slidable interlocking engagement between each filler panel and the upper and lower panels; each louver unit being pivotally supported within the front opening for rotation about a horizontal axis.

9. The evaporator casings of claim 8 wherein each cap has a pin-receiving recess facing the front opening, each filler panel has a continuous recess opening to opposite sides of the filler panel for receiving pins, and each louver unit has lateral pins projecting into the recesses for pivotally supporting the louver units.

References Cited

UNITED STATES PATENTS

| | | | |
|---|---|---|---|
| 3,012,494 | 12/1961 | Drummond | 98—40 |
| 3,194,145 | 7/1965 | Robertson | 98—40 |
| 3,252,398 | 5/1966 | First | 98—40 |
| 3,308,744 | 3/1967 | Schach | 98—40 |
| 3,370,521 | 2/1968 | Honerkamp | 98—40 |
| 3,331,304 | 7/1967 | Baus | 98—39 |

WILLIAM E. WAYNER, Primary Examiner

U.S. Cl. X.R.

98—40